Sept. 27, 1949.  E. KAMRASS  2,482,981
DEEP DRAWN RECESSED DECORATED PLEATED DOILY
Filed Jan. 28, 1948  3 Sheets-Sheet 1
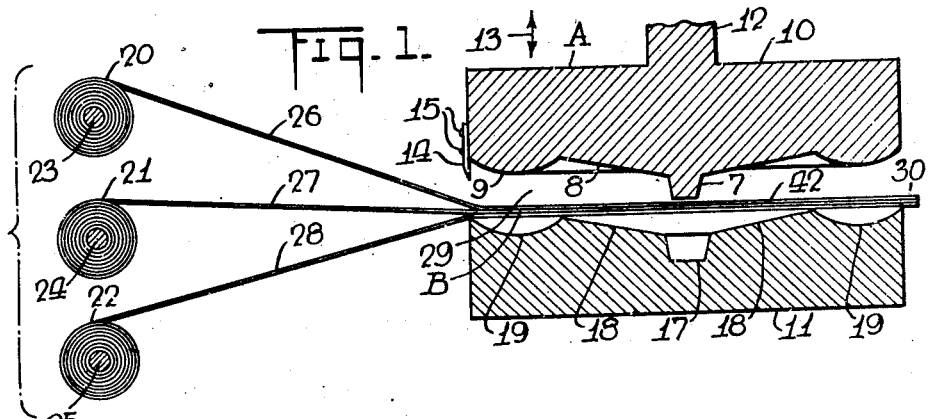
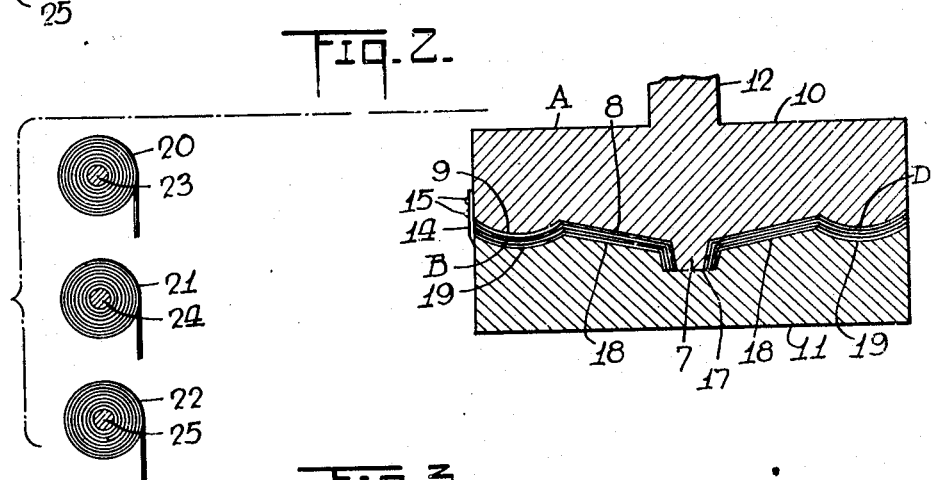
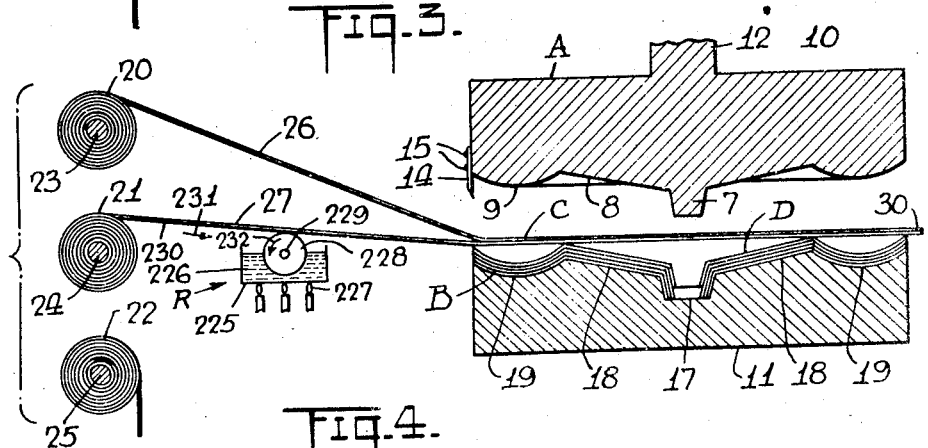
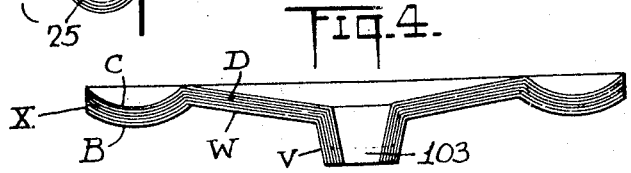
INVENTOR
*Ellis Kamrass*
BY
ATTORNEY

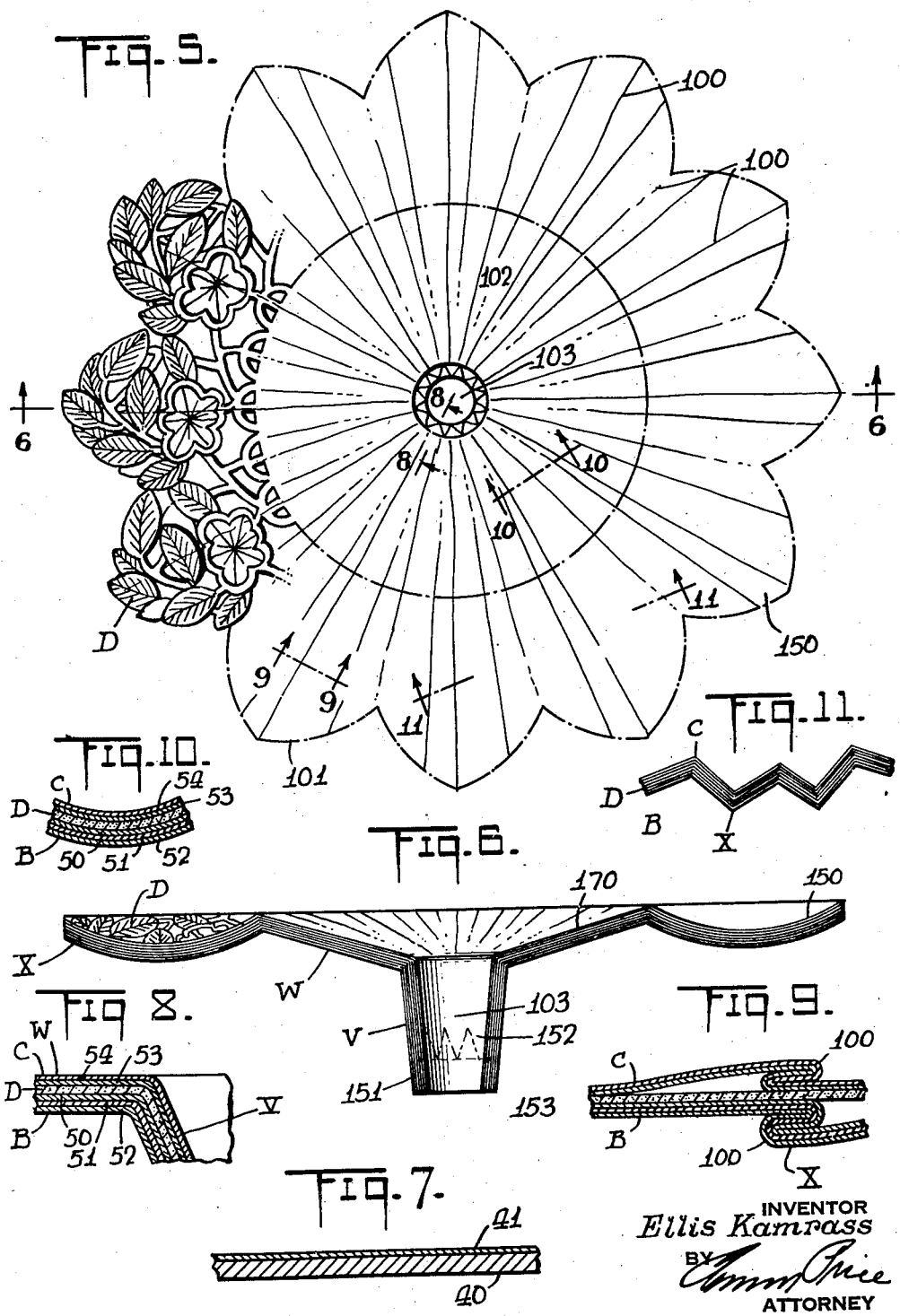

Sept. 27, 1949.  E. KAMRASS  2,482,981
DEEP DRAWN RECESSED DECORATED PLEATED DOILY
Filed Jan. 28, 1948  3 Sheets-Sheet 3
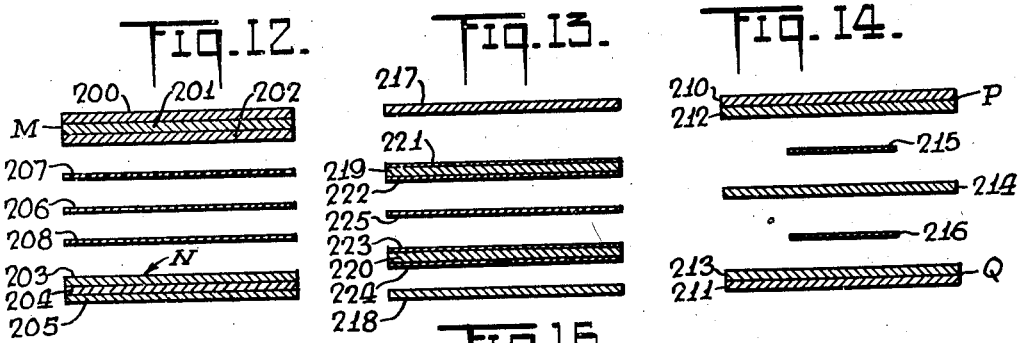
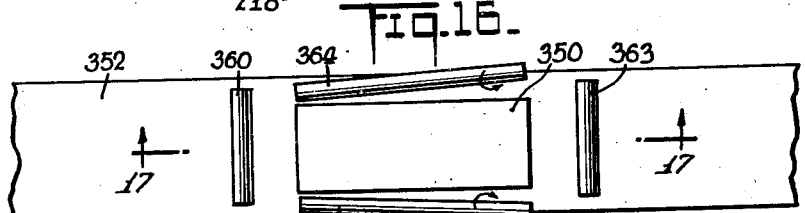
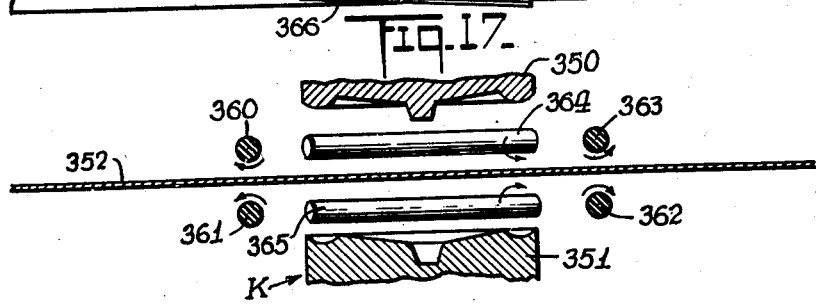
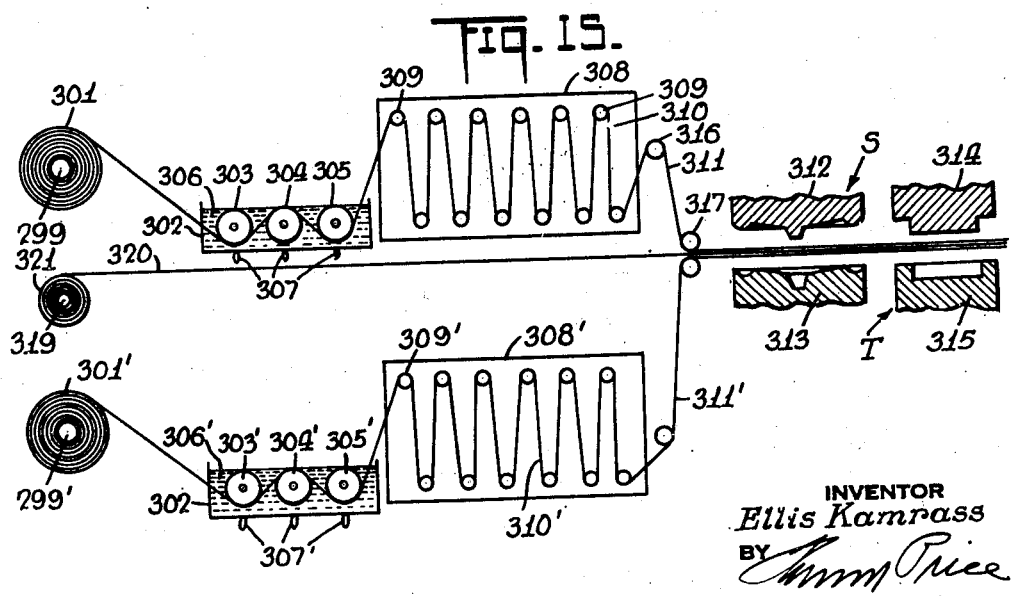
INVENTOR
Ellis Kamrass
BY
ATTORNEY Patented Sept. 27, 1949

2,482,981

UNITED STATES PATENT OFFICE 2,482,981

DEEP-DRAWN RECESSED DECORATED PLEATED DOILY

Ellis Kamrass, New York, N. Y.

Application January 28, 1948, Serial No. 4,883

8 Claims. (Cl. 41—13)

1

The present invention relates to a laminating procedure and laminated product and it particularly relates to laminated display devices.

Although not limited thereto the present invention will be particularly described in its application to the lamination of transparent sheet materials carrying a relatively opaque decorative design which is preferably applied thereto by means of insertion or interleaving of a thin paper doily or by application of a relatively opaque pigment or paint in a desired design to one or more sheets of transparent material.

It is among the objects of the present invention to provide a simple inexpensive high speed method of converting continuous strips of transparent sheet material into decorative dished or recessed laminated sheet materials.

It is another object to make novel distinctive laminated sheet materials of the character described which will be durable, hold their shape and be widely applicable as trays, dishes, containers, flower holders, doilies, mats and as decorative plaques.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most suitable according to one embodiment of the present invention to form the product first of a base having one or more sheets of a transparent sheet material such as regenerated sheet cellulose, sheet cellulose acetate, sheet synthetic rubber, or sheet vinyl resin following which the decorative paper interleaf is placed in position on the cut out and pressed base material, following which one, two or more layers of transparent sheet material are applied on the top of the paper insert and the whole is combined to form a thermoplastically fused substantially unitary sheet or decorative plaque.

It is a feature of the present invention that the material utilized is of such size and shape that there will be formed a series of folds extending radially from the center thereof and increasing in width toward the outside periphery which folds will add strength to the outside and enable it to stand up under considerable wear and tear.

The invention also consists in certain new and original features of construction and combination of parts hereinafter set forth and claimed and as to its other objects, features and advantages, the mode of operation and manner of its organization, these, inter alia, may be better understood by referring to the following description considered in connection with the accompanying drawings forming a part thereof in which:

Fig. 1 is a diagrammatic side sectional view showing the laminating procedure according to the present invention with the forming and cutting dies in vertical transverse section to the right and the rolls of sheet material to the left, the sheet material being fed to the dies;

Fig. 2 is a transverse sectional view similar to Fig. 1 showing the dies in operation laminating the sheets;

Fig. 3 is a vertical, diagrammatic sectional view similar to Figs. 1 and 2 showing the second operation of laminating;

Fig. 4 is a vertical sectional view of the laminated article as constructed after the procedure of Fig. 3;

Fig. 5 is a top plan view of a similar article on an enlarged scale as compared to Fig. 4 showing the perforated paper interleaf in position therein;

Fig. 6 is a transverse sectional view upon the line 6—6 of Fig. 5;

Fig. 7 is a fragmentary transverse sectional view of one type of regenerated sheet cellulose which may be employed, on an enlarged scale as compared to Fig. 6, showing the thermoplastic coating;

Fig. 8 is a transverse fragmentary vertical sectional view of the finished article upon the line 8—8 of Fig. 5 upon an enlarged scale as compared to Fig. 5; and Fig. 9 is a vertical transverse fragmentary sectional view upon the line 9—9 of Fig. 5 showing the reinforcing folds and upon an enlarged scale as compared to Fig. 5.

Fig. 10 is a fragmentary transverse sectional view upon the line 10—10 of Fig. 5 upon an enlarged scale as compared to Fig. 5.

Fig. 11 is a fragmentary transverse sectional view upon the line 11—11 of Fig. 5 upon an enlarged scale as compared to Fig. 5.

Fig. 12 is an exploded or separated view of an alternative arrangement of laminations and sheets to form the final doily.

Fig. 13 is an exploded or separated view of another alternative arrangement of laminations and sheets to form the final doily.

Fig. 14 is an exploded or separated view of still another alternative arrangement of laminations and sheets to form the final doily.

Fig. 15 is a side diagrammatic view illustrating an alternative method of obtaining the laminated doilies of the present invention.

Fig. 16 is a diagrammatic top plan view, showing the method of stretching the sheets or strips of material when cutting and recessing.

Fig. 17 is a diagrammatic side sectional view taken from the line 17—17 of Fig. 16, showing the tensioning arrangement.

Referring to Fig. 1, the die construction A has an upper male member 10 and the lower female member 11. The lower member 11 is designed to rest upon a base not shown.

The upper member 10 is actuated through the projecting element in the directions indicated by the double arrow 13.

The upper member 10 is diagrammatically shown as carrying a cutting knife, 14. The cutter 14 is held in position by the rivets or screws 15, but it is to be understood that other means of cutting the laminated material may be employed. The lower die is provided with a central recess 17, the shallow conical recess 18 and the peripheral recess 19.

Ordinarily there may be provided one or a plurality of rolls 20, 21 and 22 of transparent material such as transparent regenerated cellulose or heat sealing cellophane, vinyl or vinylidene resins, cellulose acetate or nylon. These rolls are carried on axles 23, 24 and 25 and although three are shown it is obvious that a larger or smaller number may also be employed.

The sheets 26, 27 and 28 are then pulled off by hand into the space 29 and through the space into the position 30 as shown in Fig. 1.

Where a thermoplastic sheet is employed, no heat sealing material is required. Where a regenerated cellulose sheet however, is employed as indicated at 40 in Fig. 7, a heat sealing surfacing 41 is applied to one or both faces thereof.

After the sheet materials 26, 27 and 28 are pulled through the space 29 between the open and upper dies 10 and 11, these dies are closed as indicated in Fig. 2. These dies are preferably sufficiently heated to seal the laminations of the base structure B together and form the composite laminated base sheet 42. The perforated or decorative paper insert D may then be centrally placed on the composite laminated base sheet 42 as indicated in Figs. 8 and 10. Then the upper laminated structure C is applied by drawing off the sheets 26 and 27 to the position 30 over the base structure 42 and the paper doily D in position thereon. Then the dies 10 and 11 are closed to laminate the top two sheets 26 and 27 onto the doily D and base structure B. This will form the final article of Figs. 4, 5 or 6.

In this manner will be produced a permanent sealed decorative embossed laminated construction as diagrammatically illustrated in Figs. 4, 5 and 6.

For example, as indicated in Fig. 8 there will be a base B formed of three heat sealing cellophane sheets 50, 51 and 52. A sheet 50 may consist of a layer of a thermoplastic sheet material such as a vinyl resin, cellulose acetate sheet, transparent sheet rubber or nylon.

The upper structure C will consist of two sheets 53 and 54 also of heat sealing cellophane, with the sheet 53 if desired alternatively being of a thermoplastic material. Reinforcing central disks of paper or plastic may also be inserted for reinforcing purposes.

The paper insert D which is shown best in Fig. 5 is cut or scored of thin paper material, which is opaque as indicated in Fig. 5. The paper insert D of Fig. 8 will be thoroughly sealed to both the base B and the superstructure C by the heat sealing or thermoplastic materials. The folds as indicated in Figs 5 and 9 will form in both superstructure C as well as the base B and they will extend from the periphery 101 to the central portion 102 being of increasing width as they extend toward the center 103.

This folded construction of the base B as well as the superstructure C not only will give a most decorative design but will also give a strong structure even with very thin sheet materials with relatively few plies. The laminated structure will serve to stand up under considerable usage, wear and tear.

If desired, metal foil of tin or aluminum may be inserted, preferably in the base B, as may also, opaque sheets of various sheet materials. The sheet materials used may also be imprinted with continuous or centered designs in opaque ink.

The sheet material used may vary widely in thickness say from 0.002 to 0.05 inch in thickness and a temperature of 180° F. to 250° F. may be applied during the heat sealing. The paper insert D may vary in thickness from 0.005 to 0.01 inch in thickness. The paper may be white and of sulphite or kraft stock and is preferably absorbent to take up the heat sealing or thermoplastic material. Metal foil when utilized should be from .0002 to .001 inch in thickness.

In various preferred constructions the following combinations have been found to be particularly satisfactory from top to bottom:

Example I (1) regenerated cellulose
(2) sheet vinyl resin or sheet synthetic rubber
(3) paper insert
(4) metal foil
(5) sheet vinyl resin
(6) regenerated cellulose
(7) regenerated cellulose

Example II (1) regenerated cellulose
(2) sheet cellulose acetate
(3) perforated metal insert
(4) sheet vinyl resin
(5) regenerated cellulose

Example III (1) regenerated cellulose
(2) paper insert
(3) sheet flexible phenol-formaldehyde or urea-formaldehyde in fusible or B condition
(4) metal foil
(5) cellulose acetate
(6) regenerated cellulose Generally the sheets on both sides of the paper insert or metal foil should be thermoplastic or thermosetting or have thermosetting or thermoplastic adhesive coatings.

The paper insert should always be above the metal foil or above any opaque or colored transparent lamination, and both the paper insert and metal foil should be perforated in a design so that the thermoplastic material may flow therethrough and form an integral bond with the adjacent cellophane sheets.

The outer portions 150 of Fig. 5 may be free of adhesive, thermoplastic or heat sealing material so that such edge portions may readily separate or be folded backwardly.

A central vertical conical neck 151 is desirable in reinforcing the center of the embossed laminated structure and desirably it may be scalloped or given an indented edge as indicated at 152 for reinforcement and enhancement of the folds 100. As shown in Fig. 6, only the inside or interior laminations have the serrated edge 152, but such edge 152 may also be applied to all the laminations at the lower edge of the nipple 151.

The outer dished portion X preferably has a wavy or sinuous cross-section, shown best in Fig. 11, while the inside deep drawn sections W and V are smooth conical surfaces (see Fig. 10). These conical surfaces if desired may be reinforced by central paper disk laminations on one or both sides of the decorated perforated paper insert D. The ridged effect of Fig. 11, together with the pleated effect of Fig. 9 and the paper insert D of Fig. 10, will give a laminated structure of great strength in spite of the drawing and dishing at X, W and V of Fig. 6.

In Fig. 12, the top lamination M and the base lamination N respectively are each formed separately of two or more sheets 200, 201, 202, 203, 204 and 205, of transparent regenerated cellulose or other transparent sheet materials. These sheet materials will have been previously laminated together by adhesive coatings or intervening plastic sheets and then used after cutting up as shown in Fig. 12. They also may be formed in continuous strips.

The decorative paper insert 206 and the thermoplastic sheets 207 and 208, such as cellulose acetate or sheet vinyl resins, are then inserted and the entire group of sheets compressed together while causing softness and incipient fusion as in the recessing and cutting dies of Figs. 1 to 3.

In Fig. 14 are shown a top laminated structure P and a base laminated structure Q each formed of regenerated cellulose sheets 210 and 211, with inside thermoplastic adhesive coatings 212 and 213, or inside thermoplastic transparent vinyl, synthetic rubber or acetyl or ethoxy cellulose sheets 212 and 213. The decorative, perforated embossed or imprinted paper insert or dolly 214 may be centrally reinforced on one or both sides by the reinforcing paper or plastic disks 215 or 216. The insertion of the paper disks 215 and 216 is particularly desirable where the central sections are relatively deeply drawn as indicated at W and V in Fig. 6.

In Fig. 13, the top laminations 217 and the bottom laminations 218 may be non heat sealing laminations of regenerated cellulose or cellophane, The intermediate sheets 219 and 220 of regenerated cellulose or cellophane may have heat sealing thermoplastic coatings 221, 222, 223 and 224. These coatings 221 to 224 may be initially applied to the strips before being placed in rolls 20, 21 and 22 of Figs. 1 to 3, or they may be applied when the strips 26 to 28 of Figs. 1 and 2 are being fed from the rolls 20 to 22 to the dies 10 and 11.

In the latter case, a roller coater R as shown in Fig. 3 may be employed running in a tank 225 containing a molten adhesive material 226. The tank 225 is heated by the flames 227. The roller 228 in the shaft 229 will turn in the molten adhesive.

The roller 228 on contact with the sheets 26, 27 and 28 will deposit a surfacing or coating of the thermoplastic adhesive material on the surface 230 of the sheet 27 which is moving in the opposite direction 231 from the direction 232 of the contacting face of the roller 228.

As many coating devices R as desired may be employed to coat the top and bottom faces of the sheets 26, 27 and 28. The roller coating devices R may serve to apply an initial thermoplastic adhesive coating or to add an additional adhesive coating to a heat adhesive coating already present. Several of the devices R may be used in succession with intermediate drying operations to give increased thickness to the adhesive coating.

In Fig. 15 is shown another device for producing decorative doilies. A paper, cellophane, woven fabric or thin sheet metal sheet or strip 301, suitably embossed, imprinted, perforated or otherwise decorated, may be rolled up in strip form on an axle 299. It is then drawn off and passed through bath 302 having guide rolls 303, 304 and 305. The rolls 303, 304 and 305 operate in resin or plastic adhesive 306 which is normally liquid or which may be put into molten condition by the flames from the heater 307.

The sheet 301 after one or more coatings is passed through drier 308 with edge guide members 309. The coated sheet 310 passes a maximum distance against a counter-current of hot drying air. Then the dried coated sheet 311 is passed by the guide rollers 316 and 317 between the upper and lower jaws 312 and 313 of a drawing die S and the upper and lower jaws 314 and 315 of the cutting die T to give the embossed and cut doilies of Fig. 6.

As shown in Fig. 15, the coating, drying, recessing and cutting may be duplicated, tripled or multiplied by the corresponding arrangement at the bottom of Fig. 15 carrying same numerals and letters primed to indicate parts functioning in the same manner.

In addition to Fig. 15, one or more intermediate inserts 320 may be applied coming off roller or feed 321 on axle 319.

The sheets 301, 301' and 320 are then laminated together by the heated drawing die S or the heated cutting device T or both.

In Figs. 16 and 17 is shown the method of achieving tension or of drawing the sheets of the laminations taut or of stretching the transparent plastic sheets prior to and during lamination. The top member 350 and bottom member 351 form the compressing or drawing die K. The sheet or sheets of paper, regenerated cellulose, vinyl plastic, synthetic plastic, silk, cotton netting or other strips 352 are clamped by the pairs of rubber faced rollers 360 and 361, 362 and 363, 364 and 365, and 366 just before the die members 350 and 351 close. The rollers 360 to 366 are driven as indicated by the arrows to stretch and tension the sheet or sheets 352 and then start slipping while holding the tension. As they hold the tension, the dies 350 and 351 come together to recess and/or cut the desired shape and form of doily.

In the embodiment of Fig. 15, the sheets 301 and 301' may be cut or perforated before entering the bath 302, if desired, as may also the intervening sheet 320. Or the intervening sheet 320 may be initially perforated and made of colored or imprinted paper or metal foil.

Threads, cuttings or flocks of cotton, rayon, silk, wool or nylon may be included in the laminated structure by application to one or two of the sheets after application of an adhesive as by the roller 228 rotating in the bath 225 of Fig. 3.

In either of the forms shown in Fig. 3 or the form shown in Fig. 15, the sheets 26, 27, 301, 301' and 320 may be printed before or after coating, impregnation or dipping in the baths 225 or 302, or if desired the cellophane or other sheet materials 26, 27, 28, 301, 301' and 320 may be printed with an opaque white ink or screen printed to give various decorative effects which will be carried into the final decorated doily as shown in Figs. 5 and 6 or to give the design as shown in Figs. 5 and 6. Instead of paper, cellophane or plastic sheets, it is also possible to include woven or knitted or netted fabrics of silk, rayon, nylon, wool, etc.

As many changes could be made in the above deep drawn recessed decorated pleated doilies and many apparently widely different embodiments of this invention could be made without departing from the scope of the claims, it is intended that all matter contained in the above description or shown in the accompanying drawings shall be interpreted as illustrative and not in a limiting sense.

Having now particularly described and ascertained the nature of the invention, and in what manner the same is to be performed, what is claimed is:

1. A frustro-conical circular heat sealed recessed laminated structure of transparent heat sealing regenerative cellulose sheet materials with an intervening opaque decorative insert sheet, said materials being heat sealed and deeply drawn together in said frustro-conical shape in an integral unitary mass, said frustro-conical structure having radially extending reinforcements.

2. A frustro-conical circular heat sealed recessed laminated structure of transparent heat sealing regenerated cellulose sheet materials with an intervening opaque decorative insert sheet, said materials being heat sealed and deeply drawn together in said frustro-conical shape in an integral unitary mass, said sheet materials consisting entirely of heat sealing regenerated sheet cellulose, said frustro-conical structure having radially extending reinforcements.

3. A frustro-conical circular heat sealed recessed laminated structure of transparent heat sealing regenerated cellulose sheet materials, said materials being heat sealed and deeply drawn together in said frustro-conical shape in an integral unitary mass, the center of said structure having a transverse depending conical nipple, said frustro-conical structure having radially extending reinforcements.

4. A frustro-conical circular heat sealed recessed laminated structure of transparent heat sealing regenerated cellulose sheet materials, said materials being heat sealed and deeply drawn together in said frustro-conical shape in an integral unitary mass, the center portion of said structure being removed and having a scalloped edge, said frustro-conical structure having radially extending reinforcements.

5. A recessed laminated deep drawn doily comprising a plurality of sheets of cellophane sealed together by a thermoplastic adhesive coating on said sheets of cellophane, said doily being reinforced by folds extending radially over the entire area thereof.

6. A deep drawn recessed decorated radially pleated doily comprising a plurality of sheets of heat sealing thin transparent regenerated cellulose having a central relatively deep downwardly extending conical portion and a relatively wide shallow peripheral wavy marginal portion with the crests of the wavy portion extending radially only through said peripheral portion and said pleats extending radially through both said central and marginal portions.

7. A circular decorated pressed deep drawn doily, for holding stemmed materials, composed of plastic sheets having a central relatively deep frustro-conical cup portion and peripheral relatively shallow portions flaring outwardly from the periphery of the central deep portion and said central deep portion having a central opening for receiving stemmed materials to be displayed.

8. The doily of claim 7, said doily being formed of heat-sealed cellophane sheets, one of which carries a lace design and the inside of the deep portion having a sharp conical extension to clamp the stems of said materials.

ELLIS KAMRASS.

REFERENCES CITED

The following references are of record in the file of this patent:

UNITED STATES PATENTS

| Number | Name | Date |
| --- | --- | --- |
| 1,730,628 | Rogers | Oct. 8, 1929 |
| 1,732,739 | Butcher | Oct. 22, 1929 |
| 1,817,184 | Fuchs et al. | Aug. 4, 1931 |
| 1,818,578 | Pedersen | Aug. 11, 1931 |
| 1,942,174 | Kaplan | Jan. 2, 1934 |
| 2,081,538 | Hoarle | May 25, 1937 |
| 2,143,141 | Cooley | Jan. 10, 1939 |
| 2,205,466 | Caprio et al. | June 25, 1940 |
| 2,362,980 | Ball | Nov. 21, 1944 |
| 2,429,177 | Young | Oct. 14, 1947 |